(12) United States Patent
Wagner

(10) Patent No.: US 7,318,704 B2
(45) Date of Patent: Jan. 15, 2008

(54) GAS TURBINE ENGINE STRUCTURE

(75) Inventor: Stefan J. Wagner, Derby (GB)

(73) Assignee: Rolls-Royce PLC, London (GB)

( * ) Notice: Subject to any disclaimer, the term of this patent is extended or adjusted under 35 U.S.C. 154(b) by 455 days.

(21) Appl. No.: 11/133,211

(22) Filed: May 20, 2005

(65) Prior Publication Data
US 2006/0018757 A1    Jan. 26, 2006

(30) Foreign Application Priority Data
Jun. 18, 2004    (GB) ................................ 0413652.9

(51) Int. Cl.
*F01D 5/32* (2006.01)
(52) U.S. Cl. ............................. 416/220 R; 416/219 R
(58) Field of Classification Search ............ 416/220 R, 416/219 R; 403/350, 351, 248
See application file for complete search history.

(56) References Cited

U.S. PATENT DOCUMENTS

| 4,344,740 A | 8/1982 | Trenschel et al. |
| 4,846,628 A | 7/1989 | Antonellis |
| 5,860,787 A | 1/1999 | Richards |
| 6,488,473 B1 | 12/2002 | Lee et al. |
| 6,494,684 B1 | 12/2002 | Wagner |
| 6,929,453 B2 * | 8/2005 | Kite et al. .............. 416/220 R |

FOREIGN PATENT DOCUMENTS

EP    1 096 107 A2    5/2001

* cited by examiner

Primary Examiner—Edward K. Look
Assistant Examiner—Dwayne J White
(74) Attorney, Agent, or Firm—Oliff & Berridge PLC

(57) ABSTRACT

A turbine disk (20) has a sealing plate (28) fixed to it by bayonet fixing features (36) and (40) formed in sealing plate flange (30) and disk flange (38). Abutments (42) and (44) are formed on the bayonet fixings, between which a multi part anti relative rotation locking member (46) is positioned in abutting relationship.

4 Claims, 3 Drawing Sheets

GAS TURBINE ENGINE STRUCTURE

The present invention relates to gas turbine engine structure. More particularly the invention relates to those parts of a gas turbine engine structure that are joined via annular portions that are locked against relative rotation during operation of an associated gas turbine engine.

It is known to join an annular seal plate against a turbine disk via cooperating bayonet features formed on each part and to lock them against relative rotation during operation of an associated gas turbine engine. The known locking means, ie wire or clips, protrudes beyond the profile of the assembly into the leakage air mass surrounding structure and an operative rotation thereof generates considerable turbulence in the leakage air mass. This in turn creates inter alia, a rise in the air temperature and a loss of engine efficiency.

It is also known to lock gas turbine engine casings together in axial alignment by using nuts and bolts that pass through abutting annular flanges on the end extremities of the respective casings. This mode of fixing generates weight penalties.

The present invention seeks to provide an anti relative rotation locking means for and on those parts of a gas turbine engine that are joined via annular portions thereon which portions include cooperating bayonet fixings.

According to the present invention anti relative rotation locking means shaped to lock together annular parts of a gas turbine engine which parts engage via bayonet features, comprises an elongate multi part abutment member having a pair of stepped abutments at each end of the whole member, wherein in use, one abutment of each pair abuts a respective opposing end face in a recess in a bayonet structure on one annular part, and each other abutment of said pairs abuts further respective opposing end faces in a recess in a cylindrical portion on the other annular part, and each step defined by each pair of adjacent abutments on said locking means locates on said cylindrical portion of said other part, thereby preventing occurrence of relative rotation between said parts, the assembled abutment member being held against separation by a removable semi rigid wire passing through its length.

The invention will now be described, by way of example and with reference to the accompanying drawings, in which.

Figure 1:
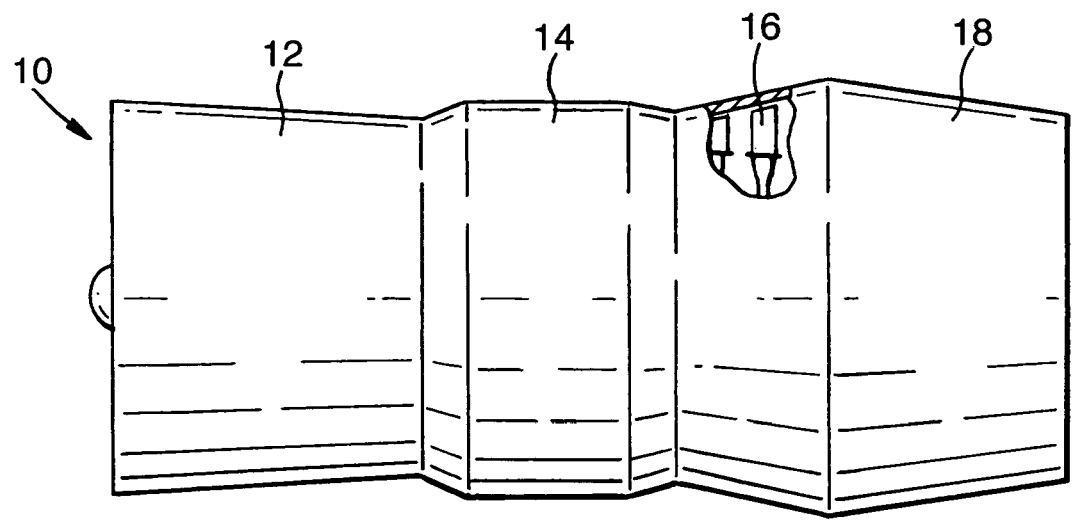
FIG. 1 is a diagrammatic view of a gas turbine engine incorporating a turbine disk and seal plate locked by locking means in accordance with the present invention.

Referring to FIG. 1. A gas turbine engine, indicated generally by the numeral 10, has a compressor 12, combustion system 14, turbine system 16 and an exhaust nozzle 18.

Figure 2:
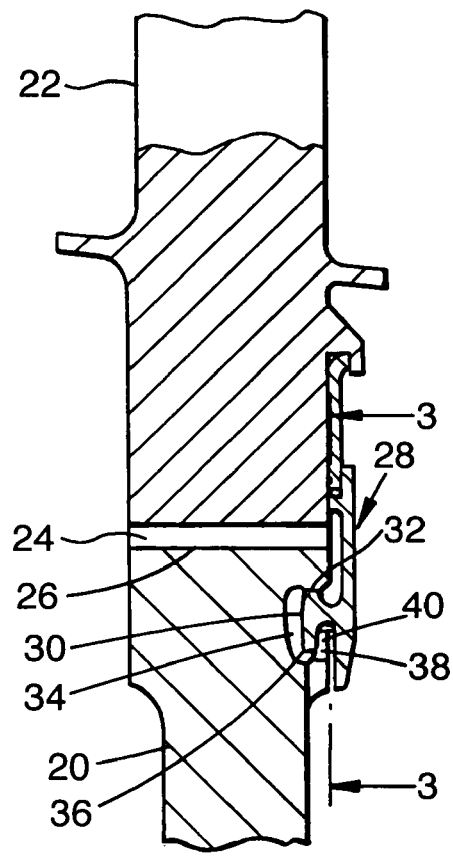
FIG. 2 is an enlarged view of the exposed turbine section of FIG. 1.

Referring to FIG. 2. A turbine disk 20 supports a ring of turbine blades, only a part of one of which, numbered 22, is shown. An annular space 24 is provided in the bottom of blade containing grooves 26 in the rim of disk 20 and the radially inner end of each blade 22, in known manner, for the known purpose of enabling a delivery of a supply of cooling air to the blades 22 during operation of engine 10. The term "radially" used here and elsewhere in this specification, means "with respect to the axis of rotation of turbine disk 20".

Known structure (not shown) is provided on the upstream face area of the disk 20 and blades 22, for the purpose of containing the cooling air in the vicinity of the space 24. Generally known structure in the form of an annular sealing plate 28 is utilised for preventing escape of the cooling from space 24. The known features of sealing plate 28 consist of a flange 30 axially spaced from the upstream face of sealing plate 28 and having an outer diameter 32 that locates in the lip of a toroid-like cavity 34 in the downstream face of disk 20. Flange 30 also has a number of equi-angularly spaced cut outs in a radially inner peripheral portion so as to form bayonet fixing features 36.

Figure 3:
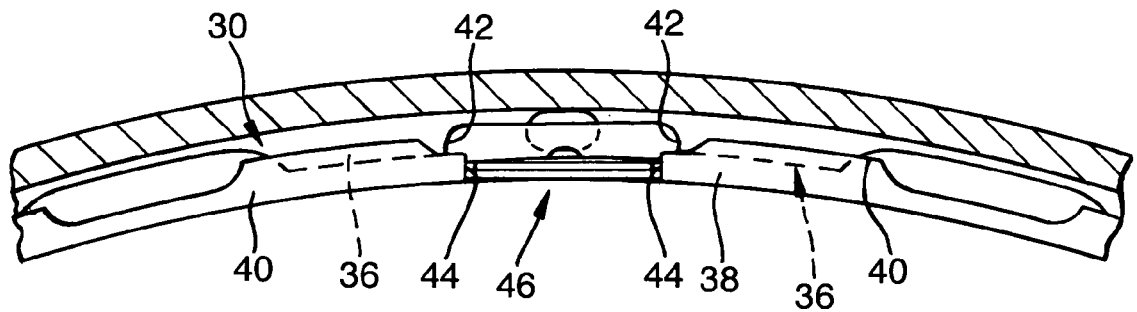
FIG. 3 is a cross sectional view on line 3-3 of FIG. 2.

The radially inner portion of cavity 34 has an annular, outwardly turned flange 38, in which cut outs are made to define bayonet fixings 40, the dimensions of which cut outs are such as to enable bayonet fixings 36 on sealing plate 28 to pass between bayonet fixings 40, prior to rotation of sealing plate 28 so as to position bayonet fixings 36 behind bayonet fixings 40, as is depicted in FIG. 3, to which reference is now made.

In FIG. 3, flange 30 is relieved to form abutments 42 on opposing ends of adjacent bayonet features 36. The cylindrical portion of flange 38 is also relieved and thus forms opposing abutments 44 between adjacent bayonet fixings 40. A locking member 46 is inserted in the relieved portions, and is so shaped as to engage abutments 42 and 44, thus locking disk 20 and sealing plate 28 against further relative rotation.

Figure 4:
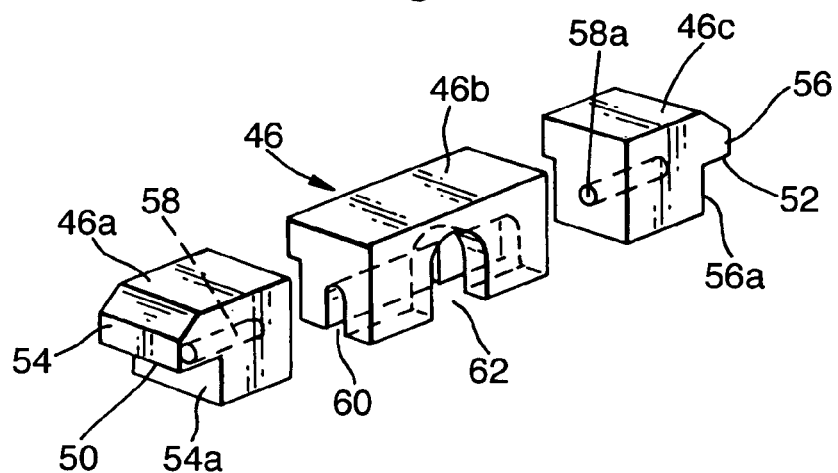
FIG. 4 is an exploded view of the locking means of FIG. 3.

Referring to FIG. 4. Locking member 46 is an assembly of three parts consisting of end pieces 46a and 46c, and centre piece 46b. End pieces 46a and 46c each have a respective step 50, 52 formed in them, which in turn define respective pairs of abutments 54, 54a and 56, 56a. End pieces 46a and 46c also have holes 58, 58a drilled through them in co-axial alignment. Centre piece 46b has a slot 60 formed through its length, which when the three parts are assembled, is aligned with holes 58 and 58a. A further slot 62 is formed in centre piece 46b in a direction normal to slot 60, and to a depth greater than that of slot 60, for reasons described in connection with FIG. 5.

The upper portions of those sides 63 of the parts of the locking member 46 are slightly thickened in the axial sense, so as to ensure their location against the bayonet features abutments on both disk 20 and sealing plate 28 respectively. Further, the radial depth of the locking device is such that its radially inner face 65 never protrudes beyond the radially inner edge of the relieved portion of disk 20, as is best seen in FIG. 5.

Figure 5:
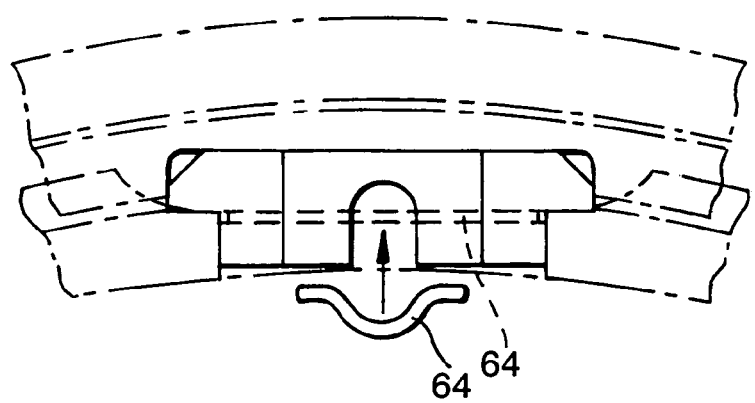
FIG. 5 is an enlarged part view of FIG. 2.

Referring to FIG. 5. Fitting of locking member 46 into the already assembled disk 20 and sealing plate 28 is achieved by first inserting a locking member end piece, say 46a, through the relieved portion in disk 20 in a direction radially thereof, between disk bayonet features 40, and locating step 50 on the flange 38 adjacent an end of a bayonet feature 40. At this juncture, end piece 46a will also engage the bottom of the relieved portion in sealing plate 28, thus preventing its further movement in the radial sense. End piece 46a is held in that position whilst end piece 46c is fitted in the same way, but at the opposite end of the relieved portion. Centre piece 46b is then inserted between the two end pieces 46a and 46c and holds them apart. Thereafter, by use of an appropriately shaped tool, a wire 64 of appropriate length and diameter is pushed into slot 60 in centre piece 46b until its ends engage the bottom of slot 60. Pushing is continued and causes wire 64 to start straightening, and as it does so it enters the opposing holes 58 and 58a. When the wire 64 has fully straightened, which is enabled by the appropriately shaped tool (not shown) entering the extended slot 62, centre piece 46c cannot be withdrawn and now, via abutments 54, 54a and 56, 56a, locks disk 20 and sealing plate 28 against relative rotation.

Nor can it be removed in an axial direction, because the radially inner annular portion 66 of sealing plate 28 covers it.

Figure 6:
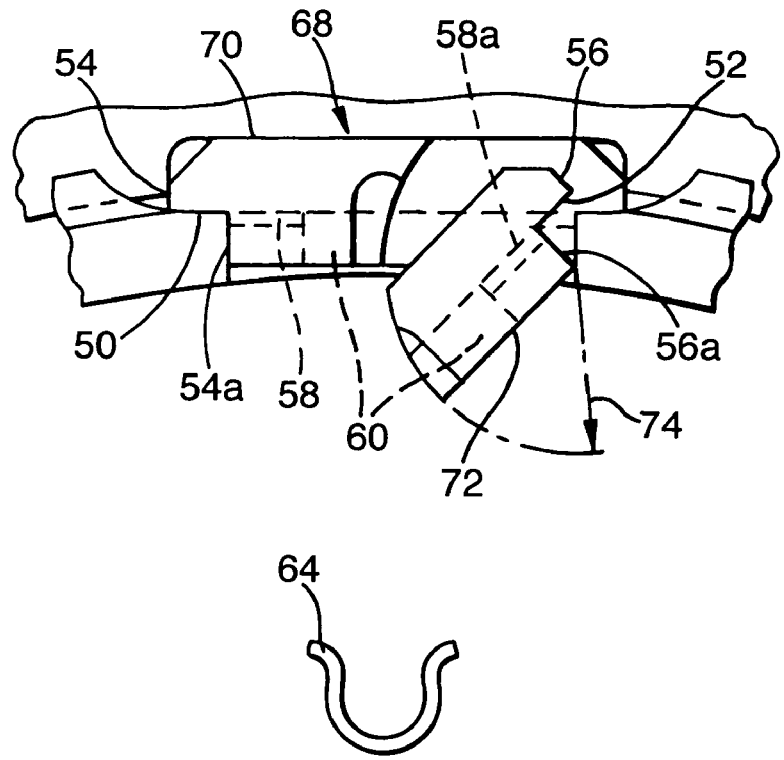
FIG. 6 depicts an alternative locking means

Referring now to FIG. 6. In this example of the present invention, the locking member generally indicated by the numeral 68 is an assembly of two parts 70 and 72, plus wire 64. Both parts 70 and 72 have steps 50, 52, and abutments 54, 54a and 56, 56a. They also have holes 58, 58a drilled through them for the same functional purpose as described hereinbefore, and a slot 60 in their adjacent ends, which slots connect with respective holes 58, 58a.

Part 70 is inserted through the bayonet fixings relieved portions as described with reference to the example in FIGS. 1 to 5. However, insertion of part 72 has to be achieved on an arcuate path, and to enable this, the engaging ends of the parts are curved, the end of part 70 being concave, and the end of part 72 being convex. The radius of curvature and the point about which it is struck is indicated by arrow 74.

Figure 7:
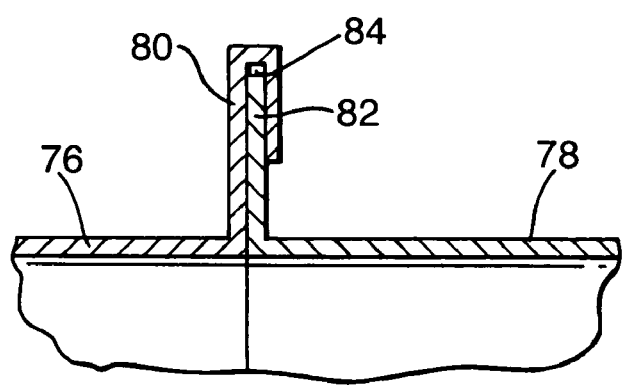
FIG. 7 depicts casings locked together by locking means in accordance with the present invention.

Referring to FIG. 7. In this example of the present invention a pair of casings 76 and 78 are joined via annular flanges 80 and 82 and though not shown, both flanges have bayonet fixings formed in them by means of which casings 76 and 78 are connected in the axial sense as is described hereinbefore with respect to disk 20 and sealing plate 28.

Again though not shown at least two sets of opposing bayonet features are profiled to accept a multi part member 46 (or 48) as described hereinbefore. However, assuming that the interior of the casing assembly would provide difficult to operate in with regard to the insertion bit by bit of the multi part member 46 or 68, the preferred mode of insertion would be radially inwardly through the rims of flanges 80,82. This means that the whole arrangement would need to be inverted relative to as shown in FIGS. 3, 5 and 6. Thus steps 50 of the locking means would engage the inner surface 84 of the flange 80 and abutments 54 would engage opposing bayonet end surfaces on flange 82.

The locking members described herein provide a number of advantages over prior art devises. For example, it can be used on components that are joined by interference fits or clearance fits. The non protruding fit reduces windage and thereby reduces operating temperatures. This can increase component life and, possibly, enable the use of cheaper materials. Further, the locking member is easy to both assemble and remove. Moreover, the retention wire is not subjected to any operating stresses or vibration generated by high speed rotation of the assembly.

At least two diametrically opposed locking members should be employed, so as to assist balancing of the rotory assembly. If more are utilised, they should be equi-angularly spaced about the assembly for the same reason.

I claim:

1. Anti-rotation locking means shaped to lock together annular parts of a gas turbine engine, which parts engage via bayonet features, comprising an elongate multi part abutment member having a pair of stepped abutments at each end of the whole member wherein in use one abutment of each pair abuts a respective opposing end face in a recess in a bayonet structure on one annular part, and each other abutment of said pairs abuts further respective opposing end faces in a recess in a cylindrical portion on the other annular part and each step defined by each pair of adjacent abutments on said locking means locates on said cylindrical portion of said other part thereby preventing occurrence of relative rotation between said parts the assembled abutment member being held against separation by a removable semi rigid wire passing through its length.

2. Locking means as claimed in claim 1 consisting of three parts that, for operation, are arranged end to end in situ in said respective recesses, wherein each end part has a hole therethrough and the centre part has a slot therein that extends to the ends thereof and is aligned with said holes, and the ends of said wire, the ends of which, for said operation, are pushed into said slot so as to spread them into said holes until said wire is straight, and thereby maintain the assembly in end to end positional relationship.

3. Locking means as claimed in claim 1 consisting of two parts that, for operation, are arranged end to end in situ in respective recesses, wherein each part has a slot in that end that abuts the other part, and a hole therethrough from said slot to one of said stepped abutment faces, the ends of said wire, for said operation, being pushed into said slots so as to spread them into said holes until said wire is straight, and thereby maintain the assembly in end to end positional relationship.

4. Locking means as claimed in claim 3 wherein the abutting ends of the two parts are curved about a common centre so as to enable fitting them into said recesses, the first part by radially outwards insertion, and the second part by tilting and rotating in a generally radially outwards direction.

* * * * *